(12) United States Patent
Noyes

(10) Patent No.: US 9,348,784 B2
(45) Date of Patent: May 24, 2016

(54) SYSTEMS AND METHODS FOR MANAGING ENDIAN MODE OF A DEVICE

(75) Inventor: Harold B Noyes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1009 days.

(21) Appl. No.: 12/325,875

(22) Filed: Dec. 1, 2008

(65) Prior Publication Data

US 2010/0138635 A1 Jun. 3, 2010

(51) Int. Cl.
*G06F 9/30* (2006.01)
*G06F 13/40* (2006.01)
*G06K 9/00* (2006.01)

(52) U.S. Cl.
CPC ........ *G06F 13/4013* (2013.01); *G06K 9/00986* (2013.01)

(58) Field of Classification Search
None
See application file for complete search history.

(56) References Cited

U.S. PATENT DOCUMENTS

| | | | |
|---|---|---|---|
| 5,300,830 A | 4/1994 | Hawes | |
| 5,331,227 A | 7/1994 | Hawes | |
| 6,240,003 B1 | 5/2001 | McElroy | |
| 6,880,087 B1 | 4/2005 | Carter | |
| 6,906,938 B2 | 6/2005 | Kaginele | |
| 6,944,710 B2 | 9/2005 | Regev et al. | |
| 7,089,352 B2 | 8/2006 | Regev et al. | |
| 7,146,643 B2 | 12/2006 | Dapp et al. | |
| 7,392,229 B2 | 6/2008 | Harris et al. | |
| 7,404,019 B2 * | 7/2008 | Moyer et al. | 710/65 |
| 7,487,131 B2 | 2/2009 | Harris et al. | |
| 7,487,542 B2 | 2/2009 | Boulanger | |
| 7,774,286 B1 | 8/2010 | Harris | |
| 8,065,249 B1 | 11/2011 | Harris | |
| 2004/0030856 A1 * | 2/2004 | Qureshi et al. | 711/202 |
| 2005/0251650 A1 * | 11/2005 | Filer et al. | 712/43 |
| 2006/0195630 A1 | 8/2006 | Walters et al. | |
| 2006/0277399 A1 * | 12/2006 | Sakamaki et al. | 712/300 |
| 2007/0075878 A1 | 4/2007 | Furodet et al. | |
| 2007/0124549 A1 * | 5/2007 | Hiramatsu | 711/154 |

(Continued)

FOREIGN PATENT DOCUMENTS

| CN | 1873633 | 12/2006 |
|---|---|---|
| CN | 101124529 | 2/2008 |

(Continued)

OTHER PUBLICATIONS

Tanenbaum, Andrew S.; "Structured Computer Organization"; Second Edition; 1984, p. 11.*

(Continued)

*Primary Examiner* — William B Partridge
(74) *Attorney, Agent, or Firm* — Fletcher Yoder, P.C.

(57) ABSTRACT

Systems, methods, and devices for managing endian-ness are disclosed. In one embodiment, a device is configured to selectively operate in one of a big-endian operating mode or a little-endian operating mode. The device may include a register in which the current endian mode of the device is indicated in at least two different bit positions within the register. The at least two different bit positions may be chosen such that a data bit in one of the bit positions would be read by a system if the device and system operate in the same endian mode, while a data bit in another of the chosen bit positions would be read by the system if the device and system are operating in different endian modes from one another. In some embodiments, the endian mode of the device may be controlled by a hardware input or a software input.

29 Claims, 15 Drawing Sheets

(56) References Cited

U.S. PATENT DOCUMENTS

| | | | |
|---|---|---|---|
| 2007/0127482 | A1 | 6/2007 | Harris et al. |
| 2007/0282833 | A1 | 12/2007 | McMillen et al. |
| 2008/0140992 | A1 | 6/2008 | Rajaram |
| 2011/0307433 | A1 | 12/2011 | Dlugosch |
| 2011/0307503 | A1 | 12/2011 | Dlugosch |
| 2012/0192163 | A1 | 7/2012 | Glendenning |
| 2012/0192164 | A1 | 7/2012 | Xu |
| 2012/0192165 | A1 | 7/2012 | Xu |
| 2012/0192166 | A1 | 7/2012 | Xu |

FOREIGN PATENT DOCUMENTS

| | | |
|---|---|---|
| JP | 2006-338231 | 12/2006 |
| JP | 2007-148622 | 6/2007 |

OTHER PUBLICATIONS

Hurson A. R.; A VLSI Design for the Parallel Finite State Automaton and Its Performance Evaluation as a Hardware Scanner; International Journal of Computer and Information Sciences, vol. 13, No. 6. 1984.
U.S. Appl. No. 60/652,738, filed Feb. 12, 2005, Harris et al.
U.S. Appl. No. 12/253,966, filed Oct. 18, 2008, Noyes.
U.S. Appl. No. 12/253,967, filed Oct. 18, 2008, Noyes et al.
U.S. Appl. No. 12/265,421, filed Nov. 5, 2008, Noyes.
U.S. Appl. No. 12/265,436, filed Nov. 5, 2008, Noyes et al.
U.S. Appl. No. 12/265,465, filed Nov. 5, 2008, Noyes.
U.S. Appl. No. 12/268,270, filed Nov. 10, 2008, Noyes et al.
U.S. Appl. No. 12/325,982, filed Dec. 1, 2008, Noyes.
U.S. Appl. No. 12/325,986, filed Dec. 1, 2008, Noyes.
U.S. Appl. No. 12/325,990, filed Dec. 1, 2008, Noyes.
U.S. Appl. No. 12/347,403, filed Dec. 31, 2008, Noyes.
U.S. Appl. No. 12/350,132, filed Jan. 7, 2009, Pawlowski.
U.S. Appl. No. 12/350,136, filed Jan. 7, 2009, Pawlowski.
U.S. Appl. No. 12/350,142, filed Jan. 7, 2009, Pawlowski.
U.S. Appl. No. 12/352,311, filed Jan. 12, 2009, Noyes.
Beesley, K. R.; Arabic Morphology Using Only Finite-State Operations; Xerox Research Centre Europe; pp. 50-57.
Bird, S. et al.; One-Level Phonology: Autosegmental Representations and Rules as Finite Automata; Association for Computational Linguistics; University of Edinburgh; vol. 20; No. 1; pp. 55-90; 1994.
Bispo, J. et al.; Regular Expression Matching for Reconfigurable Packet Inspection; IEEE.
Bispo, J. et al.; Synthesis of Regular Expressions Targeting FPGAs: Current Status and Open Issues; IST/INESC-ID, Libson, Portugal; pp. 1-12.
Brodie, B. et al.; A scalable Architecture for High-Throughput Regular-Expression Pattern Matching; Exegy Inc.; pp. 1-12.
Clark, C.; Design of Efficient FPGA Circuits for Matching Complex Patterns in Network Intrusion Detection Systems (Master of Science Thesis); Georgia Institute of Technology; pp. 1-56; Dec. 2003.
Clark, C.; A Unified Model of Pattern-Matching Circuits for Field-Programmable Gate Arrays [Doctoral Dissertation]; Georgia Institute of Technology; pp. 1-177; 2006.
Clark, C. et al.; Scalable Pattern Matching for High Speed Networks; Proceedings of the 12$^{th}$ Annual IEEE symposium on Field-Programmable Custom Computing Machines (FCCM' 04);Georgia Institute of Technology; pp. 1-9; 2004.
Clark, C. et al.; A Unified Model of Pattern-Matching Circuit Architectures; Tech Report GIT-CERCS-05-20;Georgia Institute of Technology; pp. 1-17.
Fide, S.; String Processing in Hardware; Scalable Parallel and Distributed Systems Lab; Proceedings of the 12$^{th}$ Annual IEEE symposium on Field-Programmable Custom Computing Machines (FCCM' 04);School of Electrical and Computer Engineering; Georgia Institute of Technology; pp. 1-9; 2004.
Fisk, M. et al.; Applying Fast String Matching to Intrusion Detection; Los Alamos National Laboratory; University of California San Diego; pp. 1-21.
Korenek, J.; Traffic Scanner-Hardware Accelerated Intrusion Detection System; http://www.liberouter.org/ ;2006.
Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.
Lipovski, G.; Dynamic Systolic Associative Memory Chip; IEEE; Department of Electrical and Computer Engineering; University of Texas at Austin; pp. 481-492; 1990.
Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.
Schultz, K. et al.; Fully Parallel Integrated CAM/RAM Using Preclassification to Enable Large Capacities; IEEE Journal on Solid-State Circuits; vol. 31; No. 5; pp. 689-699; May 1996.
Shafai, F. et al.; Fully Parallel 30-MHz, 2.5-Mb CAM; IEEE Journal of Solid-State Circuits, vol. 33; No. 11; pp. 1690-1696; Nov. 1998.
Sidhu, R. et al.; Fast Regular Expression Pattern Matching using FPGAs; Department of EE-Systems; University of Southern California; pp. 1-12.
Wada, T.; Multiobject Behavior Recognition Event Driven Selective Attention Method; IEEE; pp. 1-16; 2000.
Yu, F.; High Speed Deep Packet Inspection with Hardware Support; Electrical Engineering and Computer Sciences; University of California at Berkeley; pp. 1-217; Nov. 22, 2006.
Freescale and Kaspersky® Accelerated Antivirus Solution Platform for OEM Vendors; Freescale Semiconductors Document; pp. 1-16; 2007.
Summons to Attend Oral Proceedings Pursuant to Rule 115(1) from the European Patent Office dated Jun. 18, 2014.
Amini, et al., "Endian Switching Mechanism for a Memory Controller/Input/Output Subsystem in a Power Personal Computer Based System," IBM Technical Disclosure Bulletin, Sep. 1, 1995, pp. 311-313, vol. 38, No. 9, International Business machines Corp. (Thornwood), US.
European Patent Office Communication Pursuant to Article 94(3) EPC dated May 15, 2012.

* cited by examiner

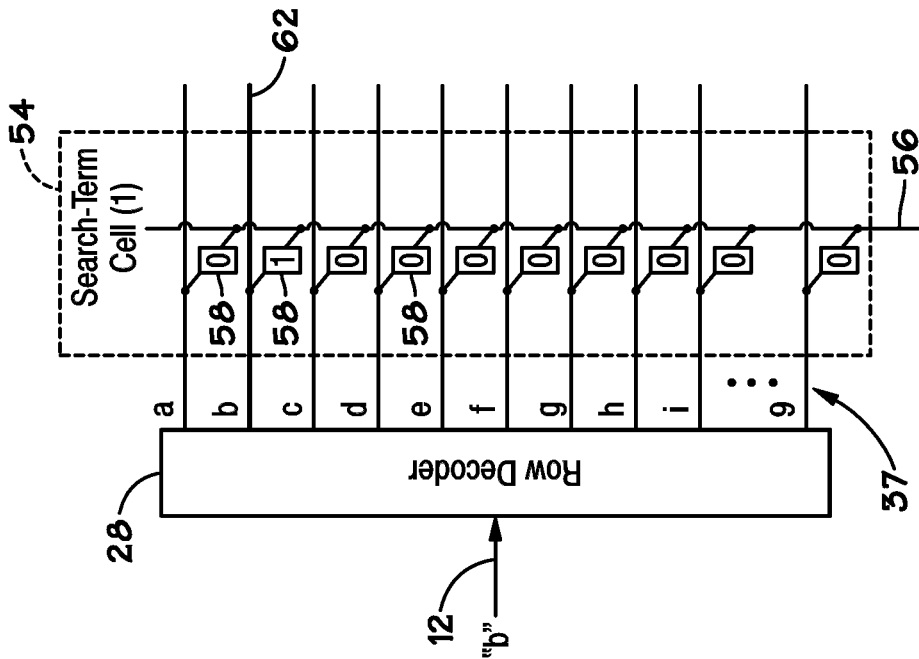
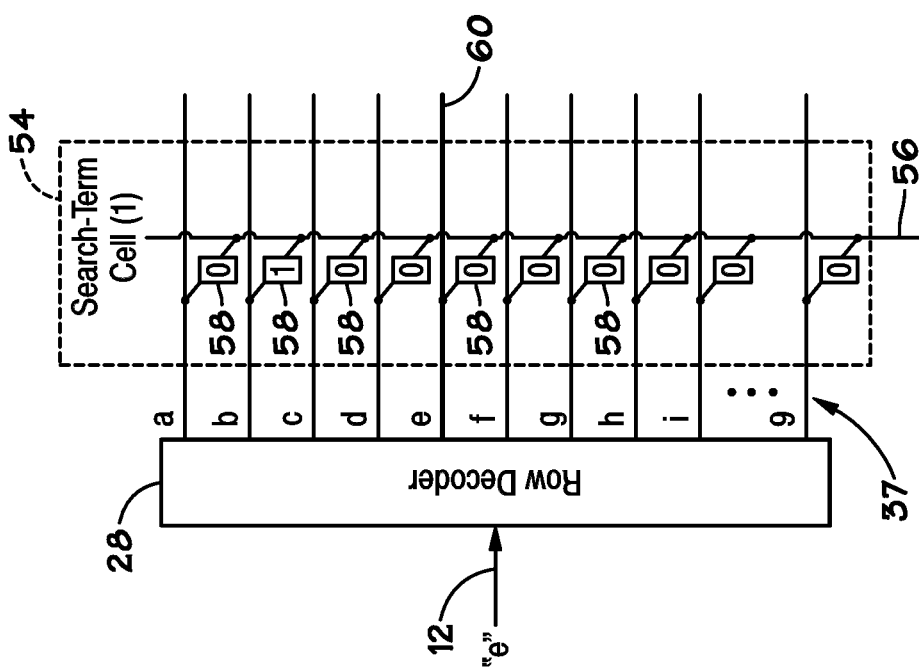

SYSTEMS AND METHODS FOR MANAGING ENDIAN MODE OF A DEVICE

BACKGROUND

1. Field of Invention

Embodiments of the invention relate generally to digital data processing, and, more specifically, in certain embodiments, to managing an endian mode of an electronic device or system.

2. Description of Related Art

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Computing hardware, such as hardware that performs the pattern recognition tasks noted above, may interface with a number of other devices. For example, pattern recognition hardware may be coupled to various processors, such as different types of microprocessors. These different types of microprocessors may interpret and store a sequence of data differently than one another. For instance, some microprocessors or other devices may operate in a "big-endian" mode, in which the most significant portions (e.g., the most significant byte in a big-endian byte order mode) of a data sequence is to be read, stored, and interpreted first. Other microprocessors or devices may operate in a "little-endian" mode, in which the least significant portions (e.g., the least significant byte in a little-endian byte order mode) of the data sequence is to be read, stored, and interpreted first. As the proper functioning of such devices may rely on the order in which they interpret data, the system will often be designed to translate, via hardware or software, data received from or being sent to such a device. Such translation by the system, however, is believed to add to system design costs and may impact system performance.

BRIEF DESCRIPTION OF THE DRAWINGS

FIGS. 4 and 5 depict the search-term cell of FIG. 3 searching the data stream for a single character;

DETAILED DESCRIPTION OF SPECIFIC EMBODIMENTS

Figure 1:
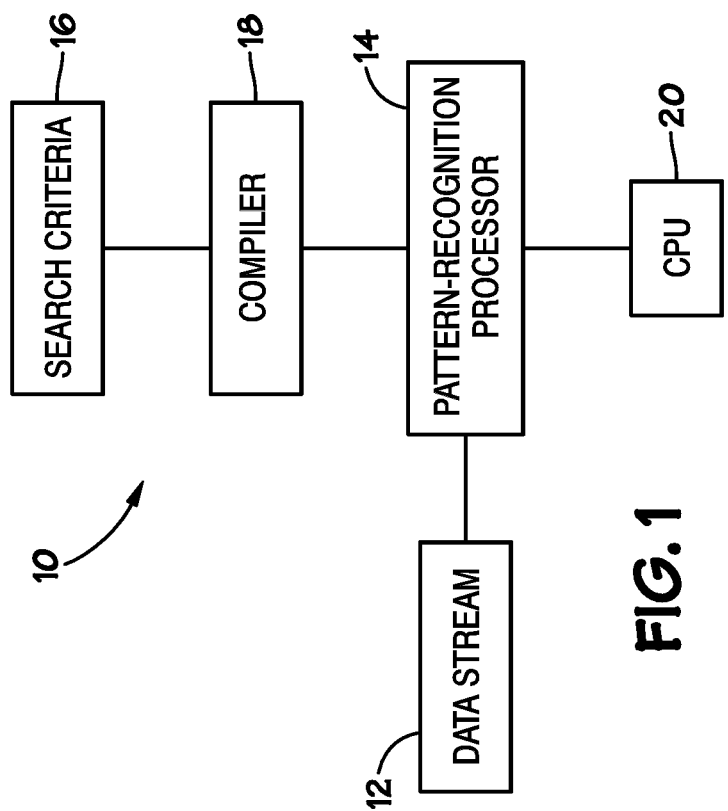
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, American Standard Code for Information Interchange (ASCII), etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Alternatively, the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern-recognition processor 14 may be hardware that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
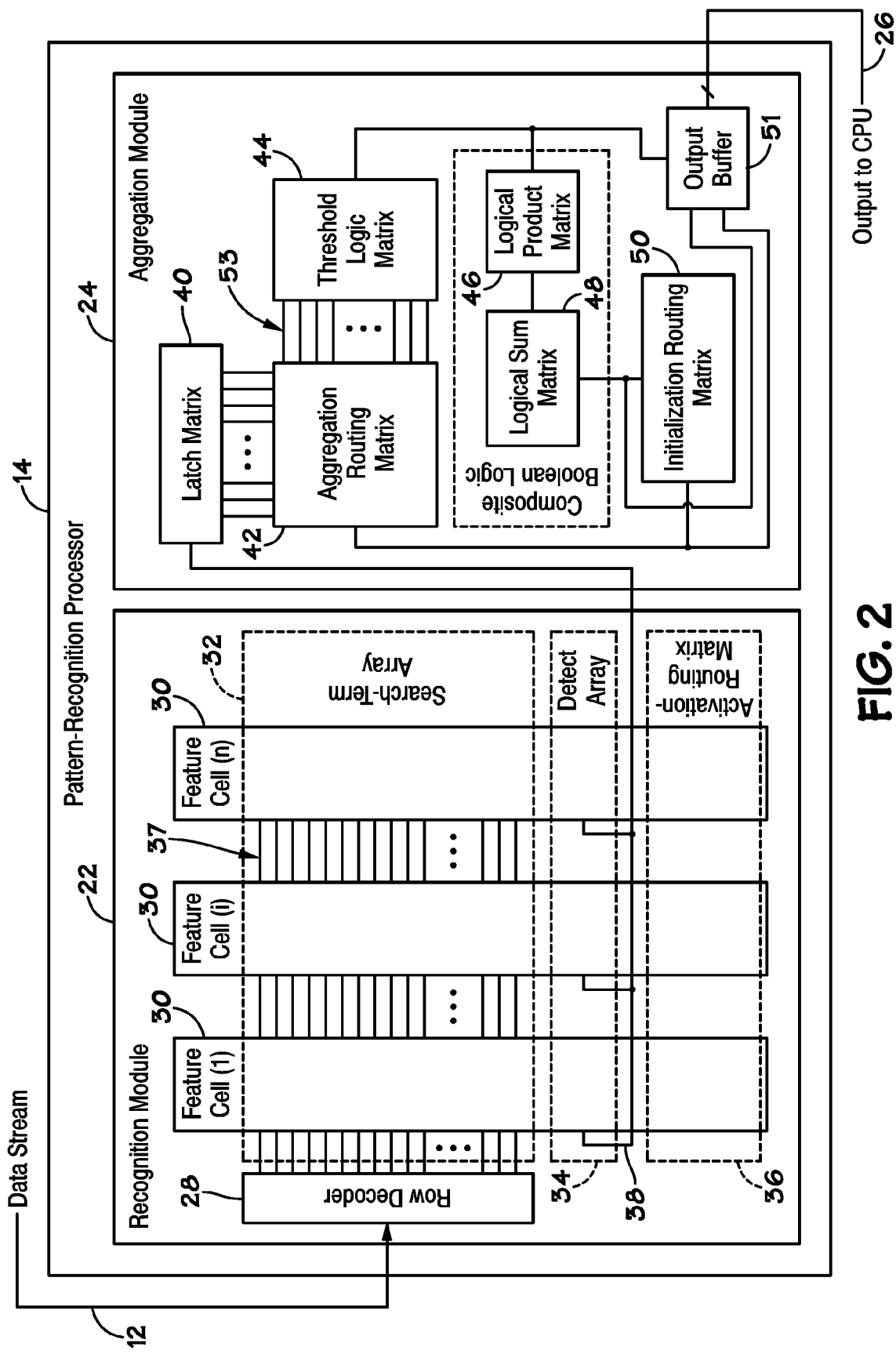
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
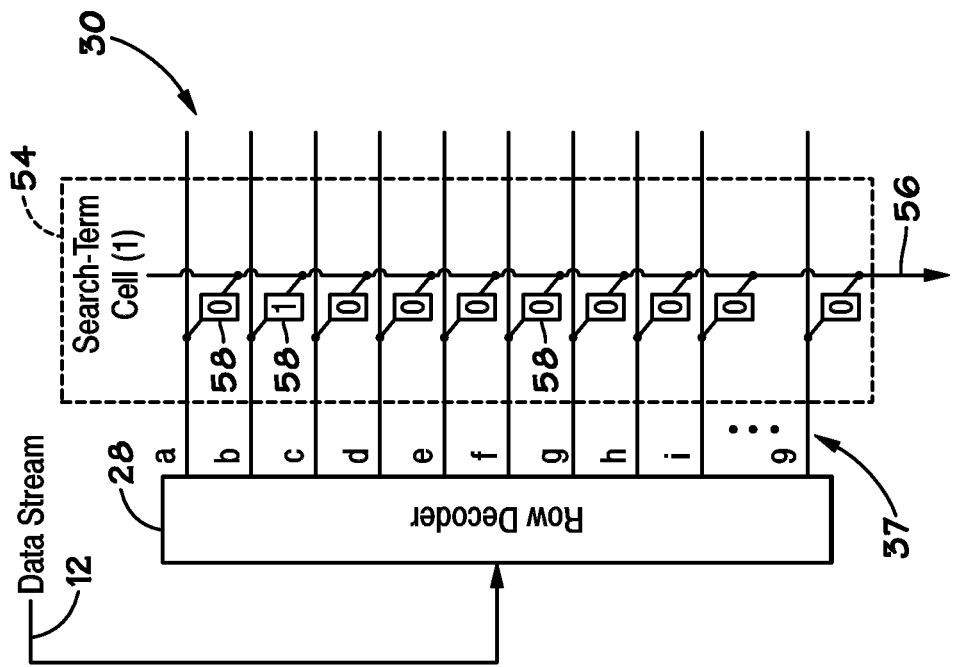
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of nonvolatile memory. The memory cells 58 may also include flip-flops, e.g., memory cells made out of logic gates.

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
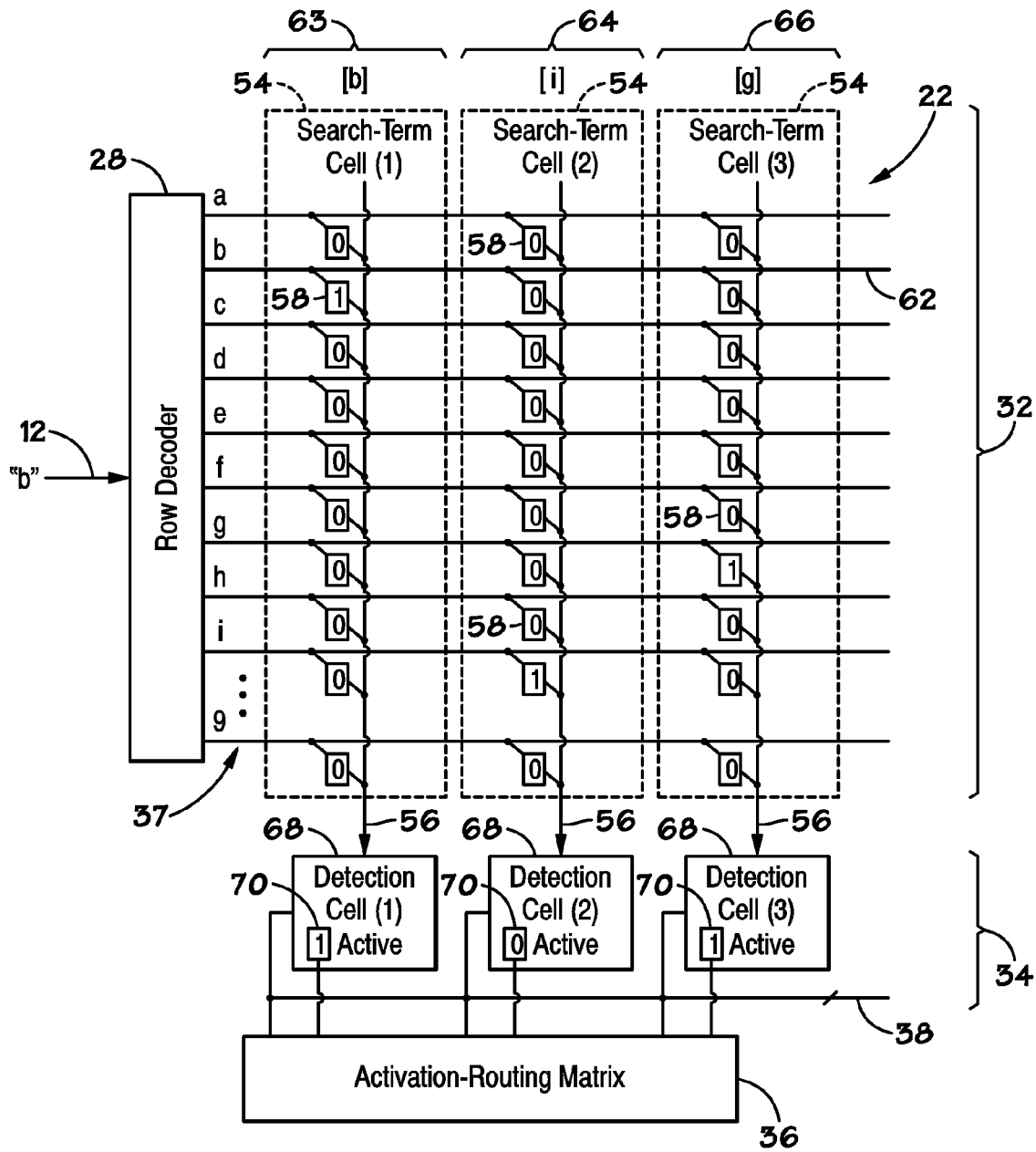
FIGS. 6-8 depict a recognition module including several search-term cells searching the data stream for a word.
Figure 7:
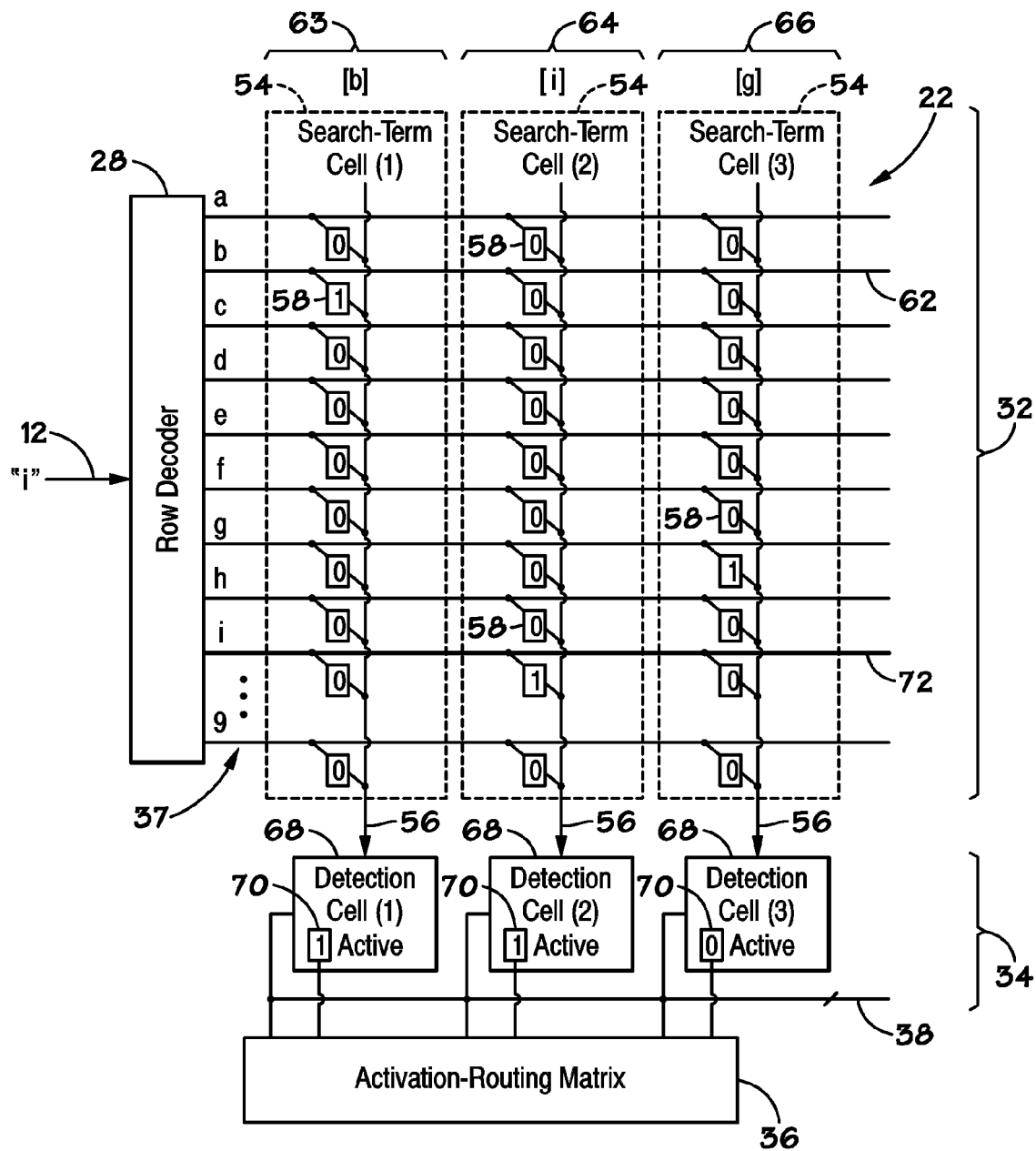
Figure 8:
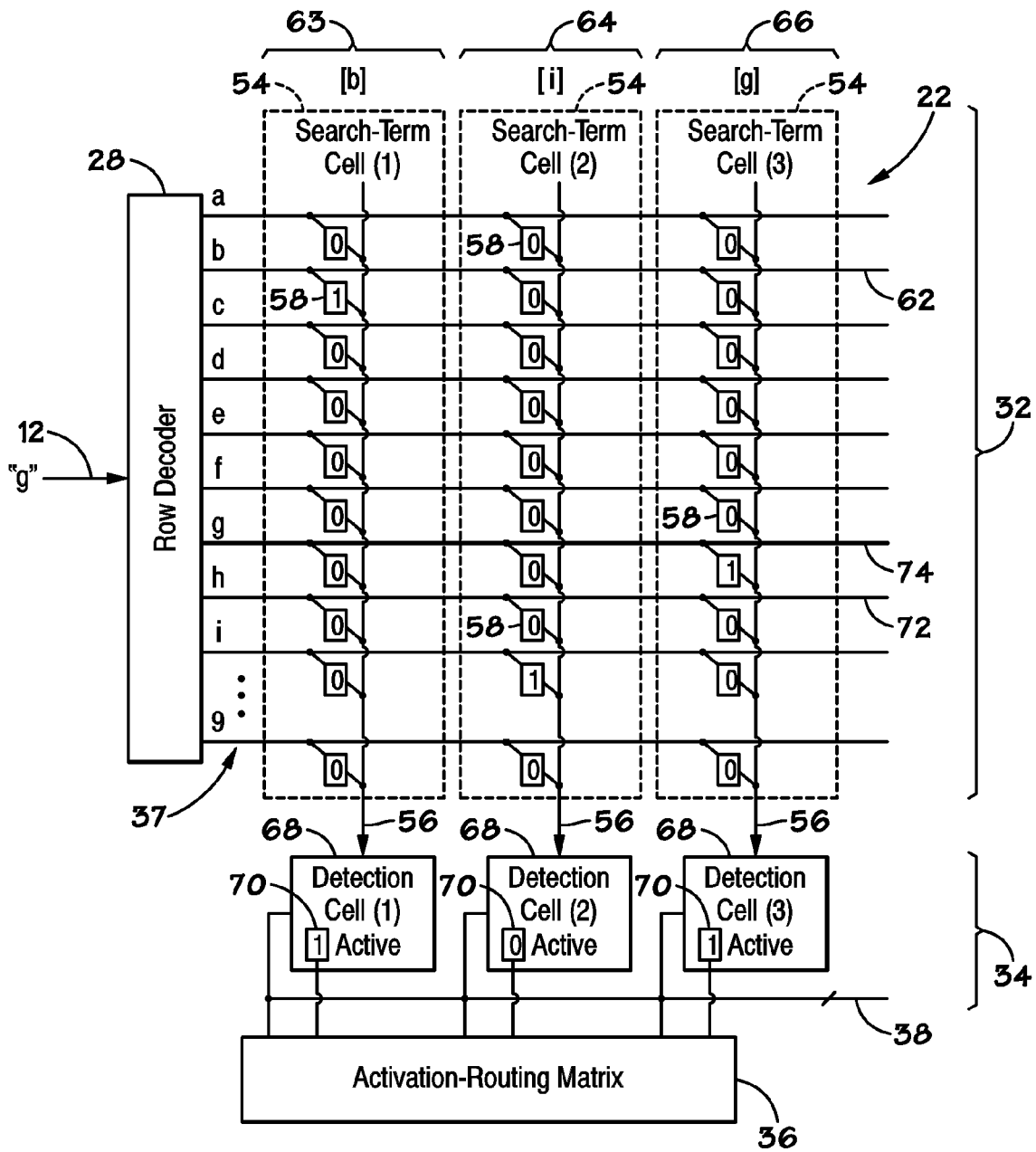

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". The feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cells 68 are active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 68 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which is active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell. The self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
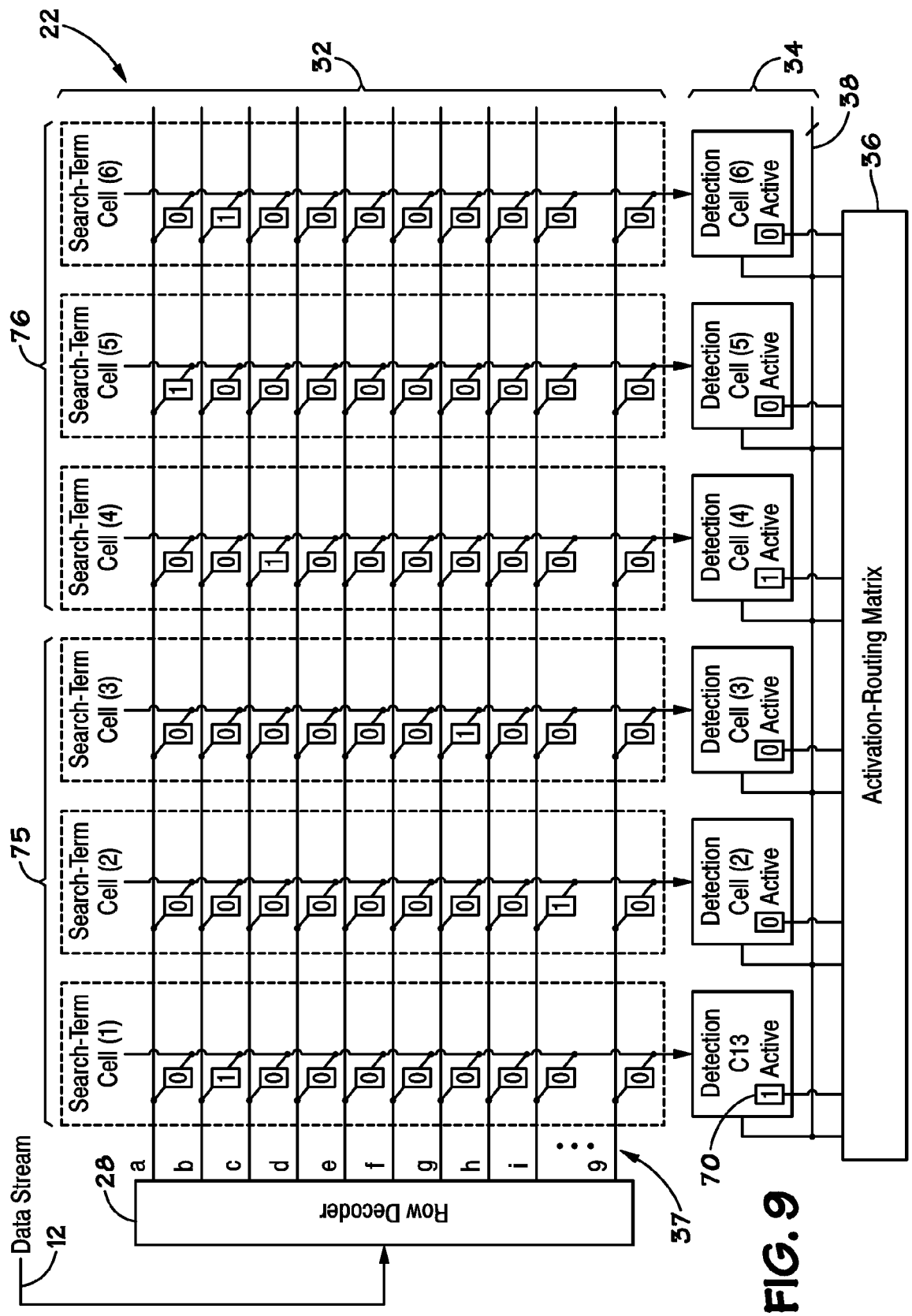
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
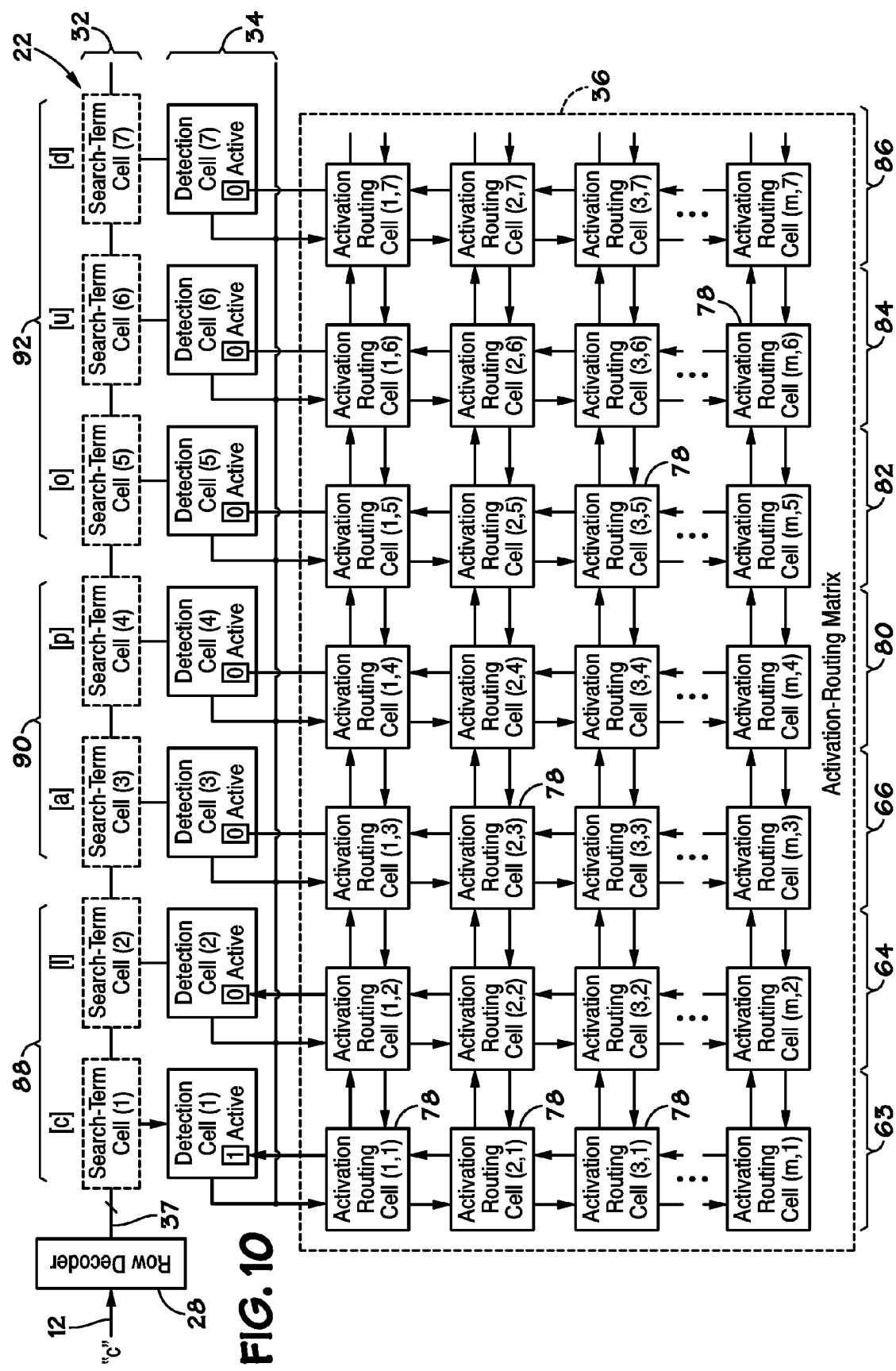
FIGS. 10-12 depict the recognition module searching according to a search criterion that specifies multiple words with the same prefix.
Figure 11:
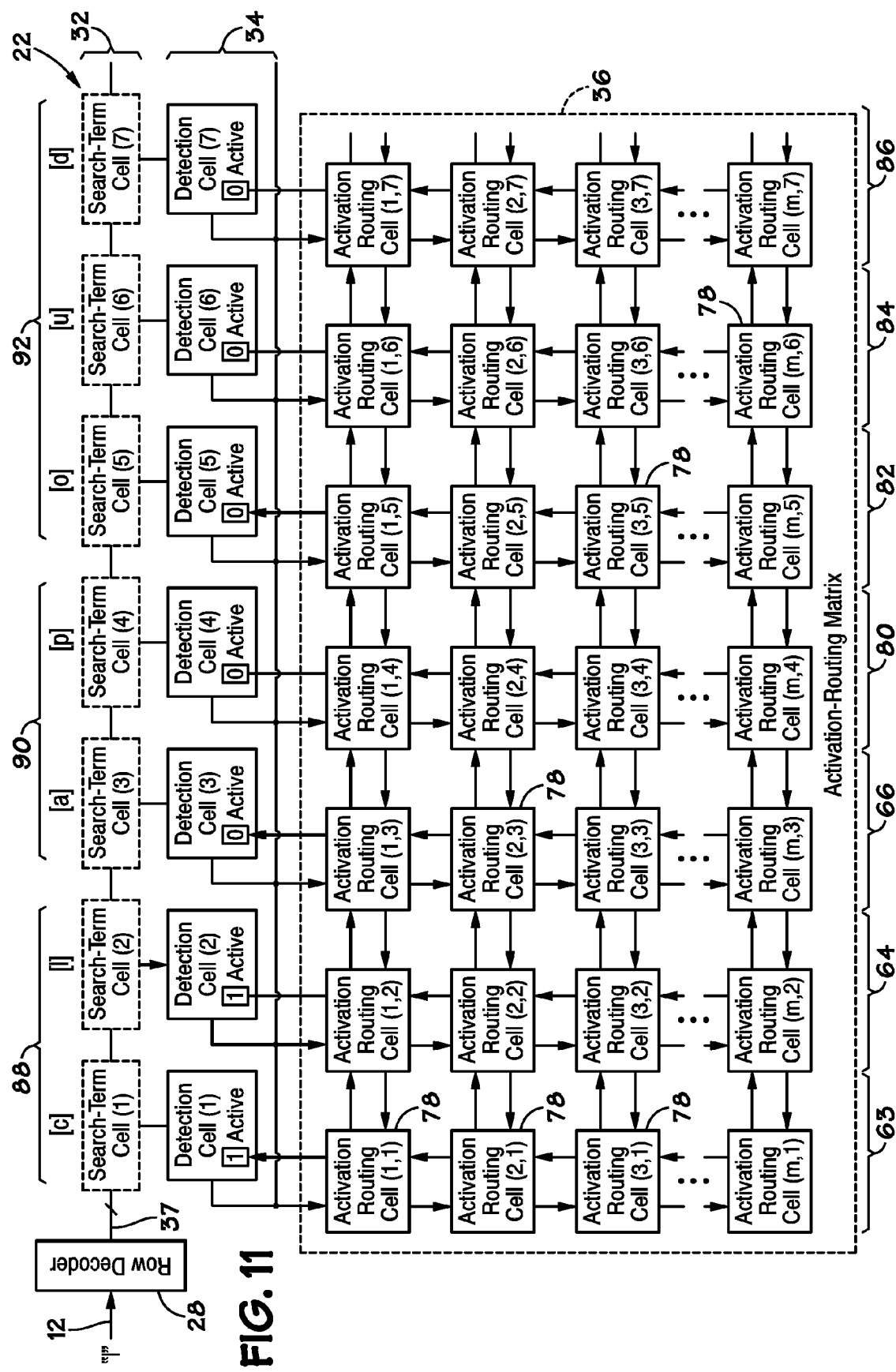
Figure 12:
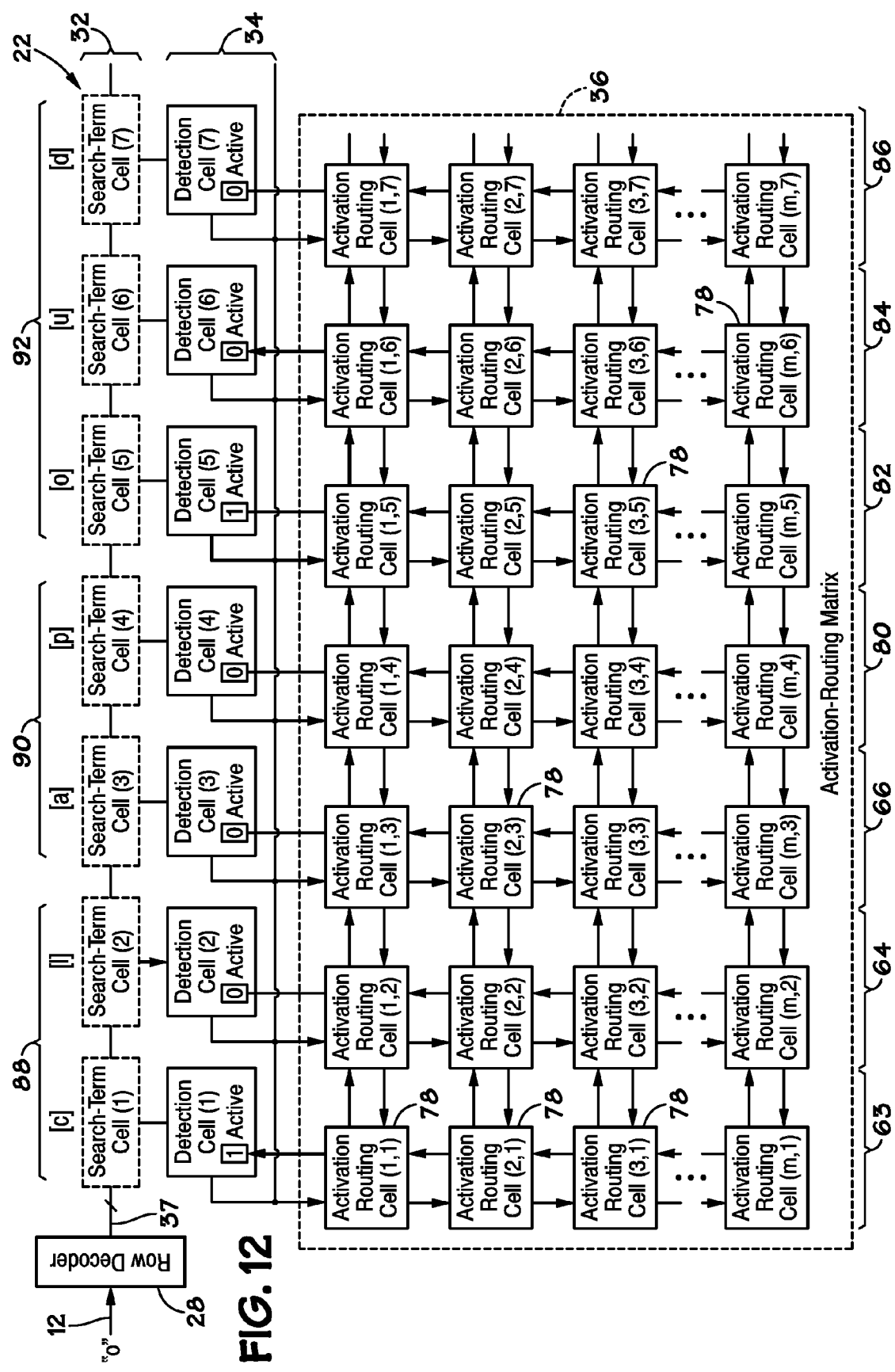

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

Figure 13:
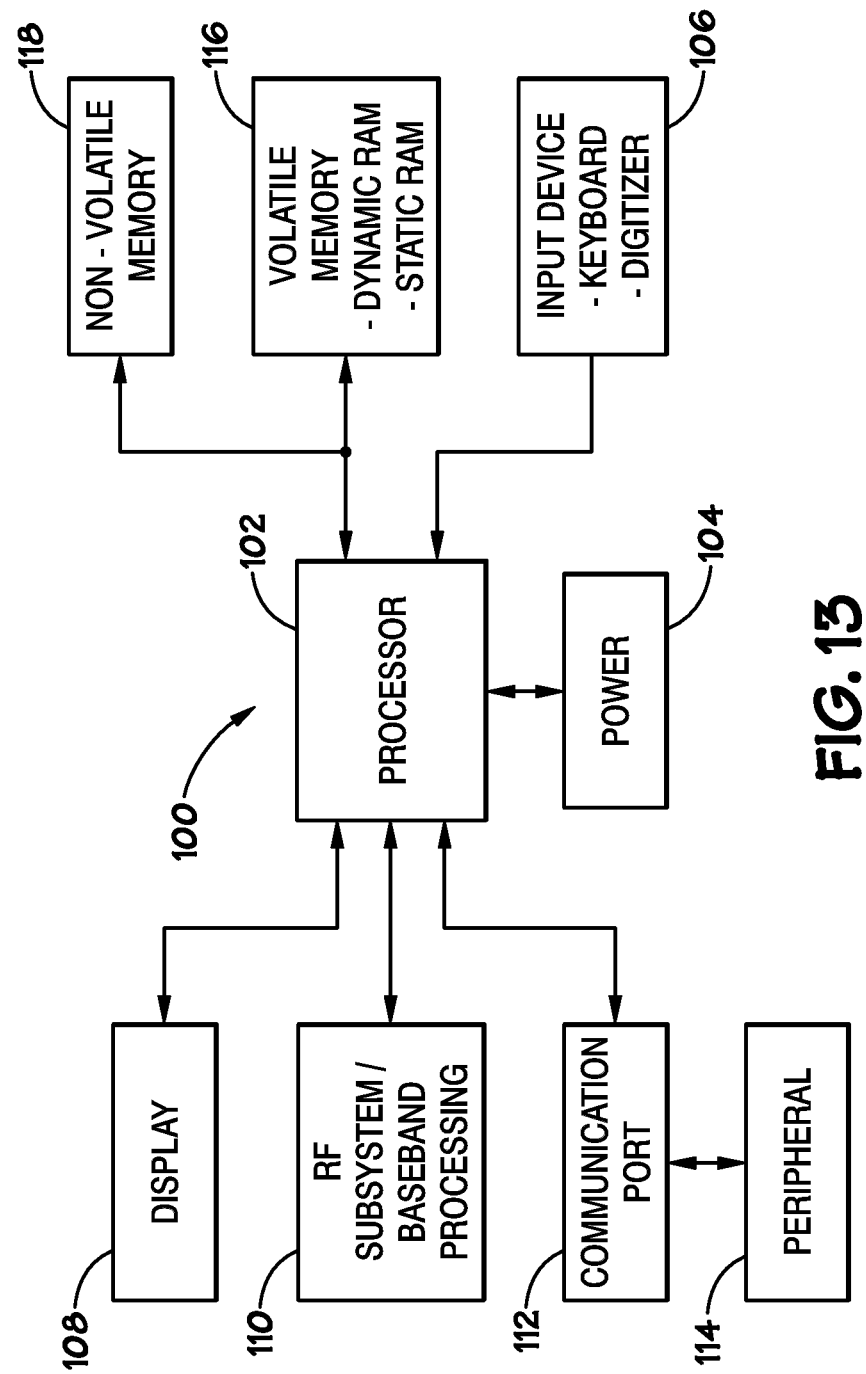
FIG. 13 is a block diagram of an electronic system that may operate in a particular endian mode in accordance with one embodiment.

FIG. 13 is a block diagram of an electronic device or system in accordance with one embodiment. The electronic device or system, which is generally referred to by the reference numeral 100, may be any of a variety of types of systems having some or all of the components depicted in FIG. 13. For instance, in various embodiments, the system 100 may include any of various computers (e.g., personal computers, servers, or network appliances), a network device (e.g., access points, routers, or modems), a personal organizer, a cell phone, or the like. In some embodiments, a processor 102, such as a microprocessor, controls the operation of system functions and requests.

The system 100 may include a power supply 104, which may include a battery, an AC power adapter, or a DC power adapter, for instance. Various other devices may be coupled to the processor 102 depending on the functions that the system 100 performs. For example, an input device 106 may be coupled to the processor 102 to receive input from a user. The input device 106 may include a user interface, which may include buttons, switches, a keyboard, a light pen, a mouse, a digitizer, a voice recognition system, or any of a number of other input devices. A display 108 may also be coupled to the processor 102 to provide information to the user. The display 108 may include an liquid crystal display (LCD), a cathode ray tube (CRT) display, or light-emitting diodes (LEDs), for example.

A radio-frequency (RF) sub-system/baseband processor 110 may be coupled to the processor 102 to provide wireless communication capability. The RF subsystem/baseband processor 110 may include an antenna that is coupled to an RF receiver and to an RF transmitter (not shown). Furthermore, a communications port 112 may be adapted to provide a communication interface between the electronic system 100 and a peripheral device 114. The peripheral device 114 may include a docking station, expansion bay, or other external component. In some embodiments, the peripheral device 114 may provide pattern-recognition functionality, such as that described above with respect to FIGS. 1-12.

The processor 102 may be coupled to various types of memory devices to facilitate its operation. For example, the processor 102 may be connected to various memory devices, such as volatile memory 116, non-volatile memory 118, or both. The volatile memory 116 may include a variety of memory types, such as static random access memory (SRAM), dynamic random access memory (DRAM), or a generation of Double Data Rate (DDR) memory (e.g., DDR1, DDR2, DDR3, etc.). The non-volatile memory 118 may include various types of memory such as electrically programmable read only memory (EPROM) or flash memory, for example. Additionally, the non-volatile memory may include one or more optical or magnetic storage devices, such as a tape or disk drive memory, instead of or in addition to solid-state memory storage devices. Such storage media may include various application instructions that may be executed by the processor 102 to enable or perform numerous functions, including those functions discussed below with respect to managing endian-ness of a device.

Figure 14:
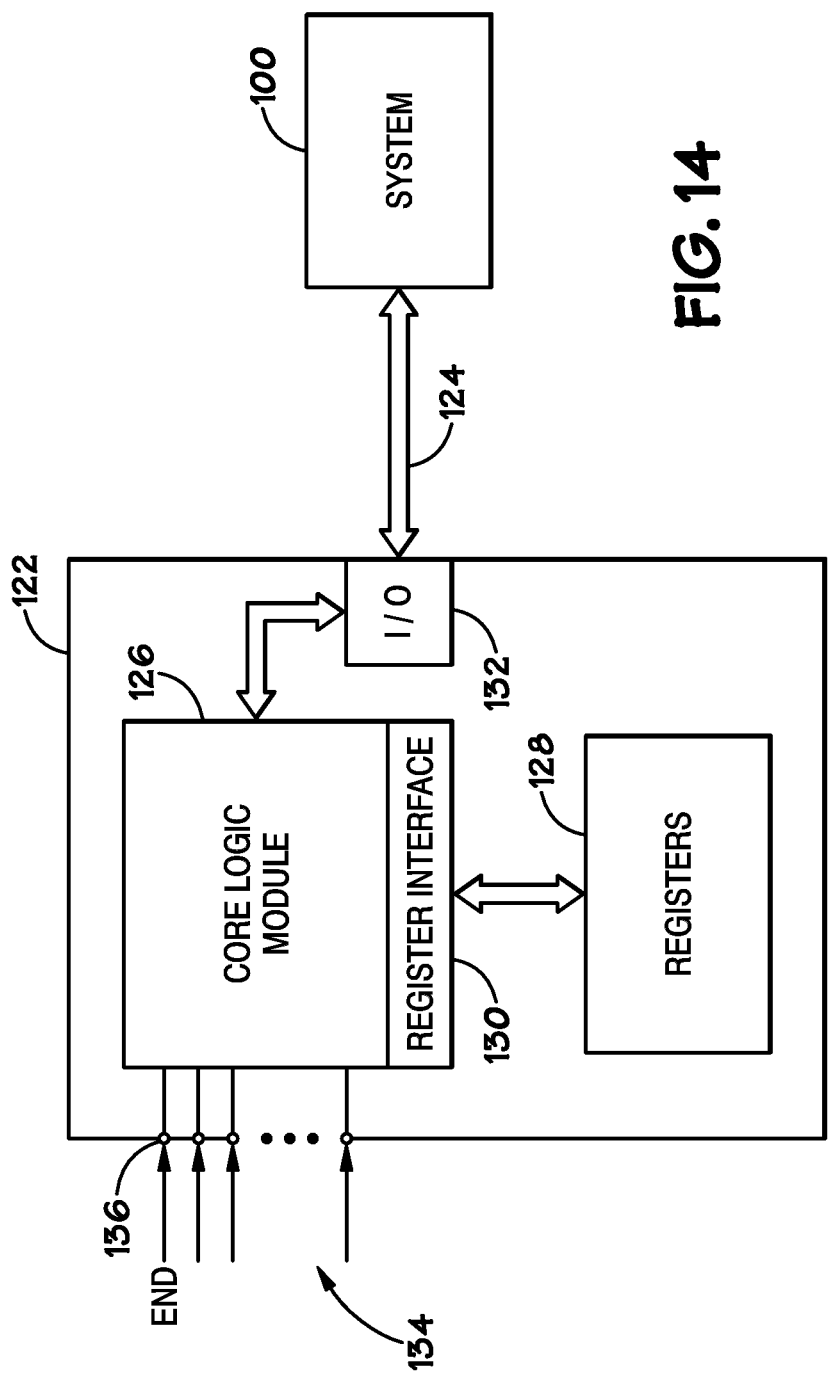
FIG. 14 illustrates an example of a device that may communicate with the electronic system of FIG. 13, and that may switch between different endian modes.

In some embodiments, the system 100 may communicate with an additional device 122, as generally illustrated in FIG. 14. In some embodiments, the additional device 122 may be a router, a modem, or some other network device, although other devices are also envisaged. Communication between the system 100 (or components thereof) and the device 122 may be effected through any suitable data bus 124. In some embodiments, the data bus 124 may include, but is not limited to, a synchronous dynamic random access memory (SDRAM) bus, a DDR memory bus (e.g., a DDR1 bus, a DDR2 bus, a DDR3 bus, etc.), or some other multi-byte parallel bus. Although the device 122 is depicted as distinct from the system 100 in the presently illustrated embodiment, it is noted that the device 122 and the system 100 (or various components of the device 122 or system 100) may be integrated into a common device or system. For example, in one embodiment, the system 100 may include a computer that communicates with a device 122 that includes a modem. In another embodiment, however, the device 122 may be integrated into a computer system 100.

The device 122 may include a core logic module 126 and one or more registers 128 that cooperate to allow the device 122 to carry out its intended functionally. For example, in one embodiment, the device 122 may include a pattern-recognition device in which the core logic module 126 and the registers 128 provide, among other things, the functionality described above with respect to FIGS. 1-12.

As generally noted above, various electronic devices may read, write, and interpret a sequence of data in accordance with a big-endian mode or a little-endian mode. Although the examples provided herein are described and illustrated in relation to big-endian and little-endian byte order, it should be appreciated from these examples that the present techniques may also be applied to manage big-endian and little-endian bit-order, word-order, or the like.

In one embodiment, the core logic module 126 includes a register interface 130 that enables data to be written to or read from the registers 128 in accordance with various device endian modes, which may be selected based on a hardware input or via software as discussed in greater detail below. In the presently illustrated embodiment, input/output circuitry 132 facilitates communication between the device 122 and components of the system 100, via the data bus 124. It is again noted that the device 122 (or components thereof) may be separate from or integrated into the system 100, and it should be appreciated that the input/output circuitry 132 may be configured to communicate over any of various types of internal or external data buses, including those parallel buses noted above.

The device 122 may include hardware input pins 134 that are configured to provide control signals to the core logic module 126 or other components of the device 122. Further, in one embodiment the hardware input pins 134 may include an "endian-ness" input pin 136 to control the endian mode of the device 122. For instance, the device 122 may be configured to operate in a little-endian mode if a signal on the endian-ness input pin 136 is "low" (e.g., tied to ground) and to operate in a big-endian mode if the signal on the input pin 136 is "high".

Figure 15:
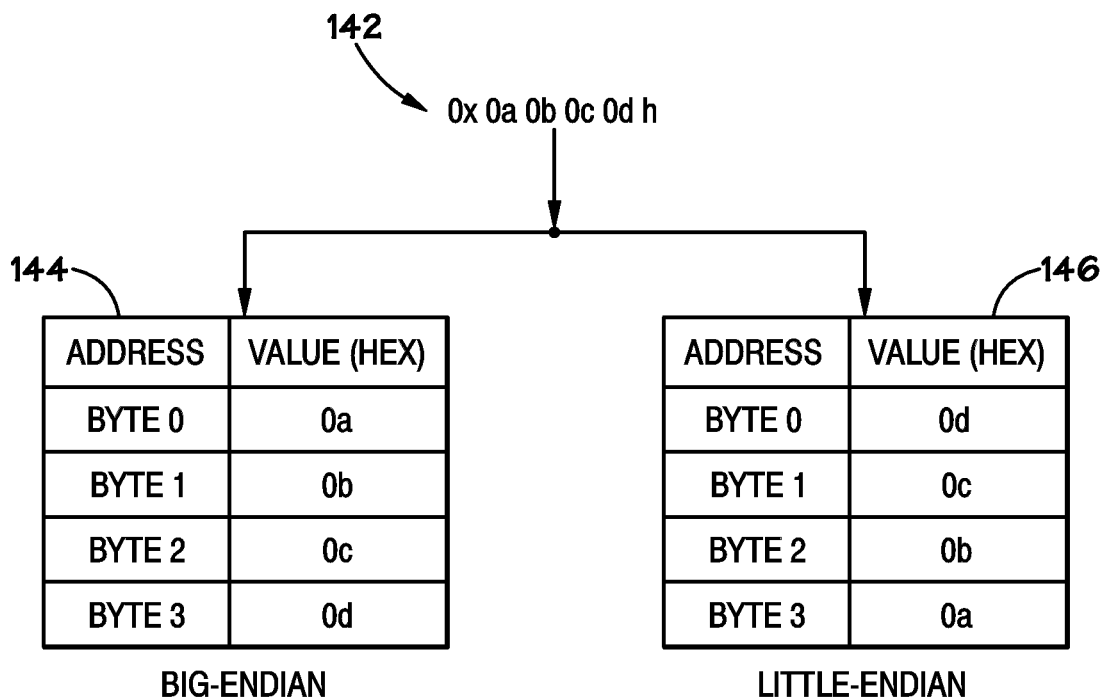
FIG. 15 depicts the storing of a 32-bit value in accordance with each of a little-endian mode and a big-endian mode in accordance with one embodiment.

For explanatory purposes, an example of how a 32-bit data value 142 would be stored in accordance with each of a big-endian mode and a little-endian mode is depicted in FIG. 15. In the present example, the value 142 is written in hexadecimal format as: 0x0a0b0c0d. To store such a value, a big-endian system would typically store the most significant byte (i.e., 0x0a) at one byte address, while the other bytes (i.e., 0x0b, 0x0c, 0x0d) would be stored at successively increasing byte addresses, as generally shown in table 144. Conversely, a little-endian system would typically store the least significant byte (i.e., 0x0d) at a particular byte address, and would then store the remaining bytes at successively increasing byte addresses according to their relative significance, as generally shown in table 146.

Because big-endian and little-endian systems expect sequential data to be written, read, and interpreted in different orders, if the system 100 and the device 122 operate in different endian modes from one another, data transmitted from one of the system 100 or the device 122 may be misinterpreted by the other. For example, in an embodiment in which the value 142 is sent sequentially (e.g., one byte at a time, or one bit at a time), a big-endian device 122 may first send the 0x0a component (i.e., the most significant byte) of the value 142 over the data bus 124, followed in sequence by the 0x0b, 0x0c, and then 0x0d components (which are of decreasing significance). If, however, the system 100 is operating in a little-endian mode, it will receive the 0x0a component first but interpret this byte as the least significant byte (rather than the most significant byte as interpreted by the big-endian device 122), and will interpret the 0x0b, 0x0c, and 0x0d components as increasingly significant (rather than decreasingly significant). Thus, without some form of correction, the big-endian device 122 will have interpreted the sent data as: 0x0a0b0c0d, but the little-endian system 100 will interpret the received data as having a value of: 0x0d0c0b0a.

Figure 16:
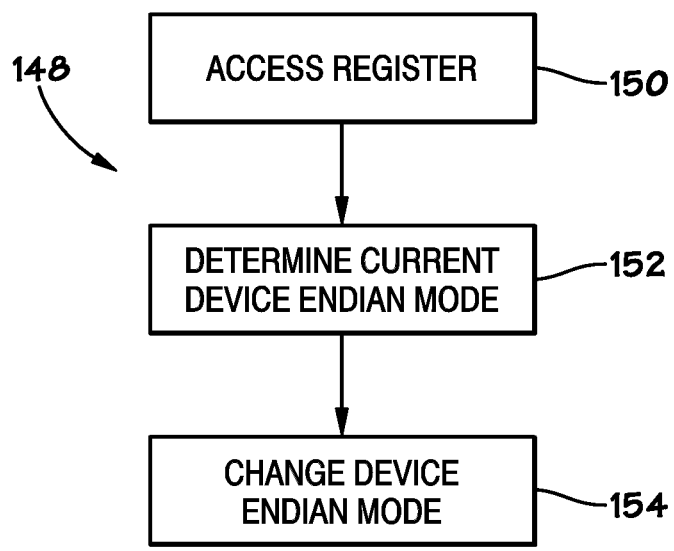
FIG. 16 is a flowchart of a method of changing the endian mode of the device of FIG. 14 in accordance with one embodiment.

In some embodiments, the register interface 130 of the device 122 may be configured to translate data communicated between a system 100 and the device 122 operating in different endian modes. In one embodiment, the endian mode of the device 122 may be managed in accordance with a method 148, as generally illustrated in FIG. 16. The method 148 may generally include a step 150 of accessing one or more registers 128 of the device 122 and, in a step 152, determining the current endian mode in which the device 122 is operating, as discussed in greater detail below with respect to FIGS. 17 and 18. Once the current endian mode of the device 122 is determined, the endian mode of the device 122 may be changed in a step 154, as also discussed below.

Figure 17:
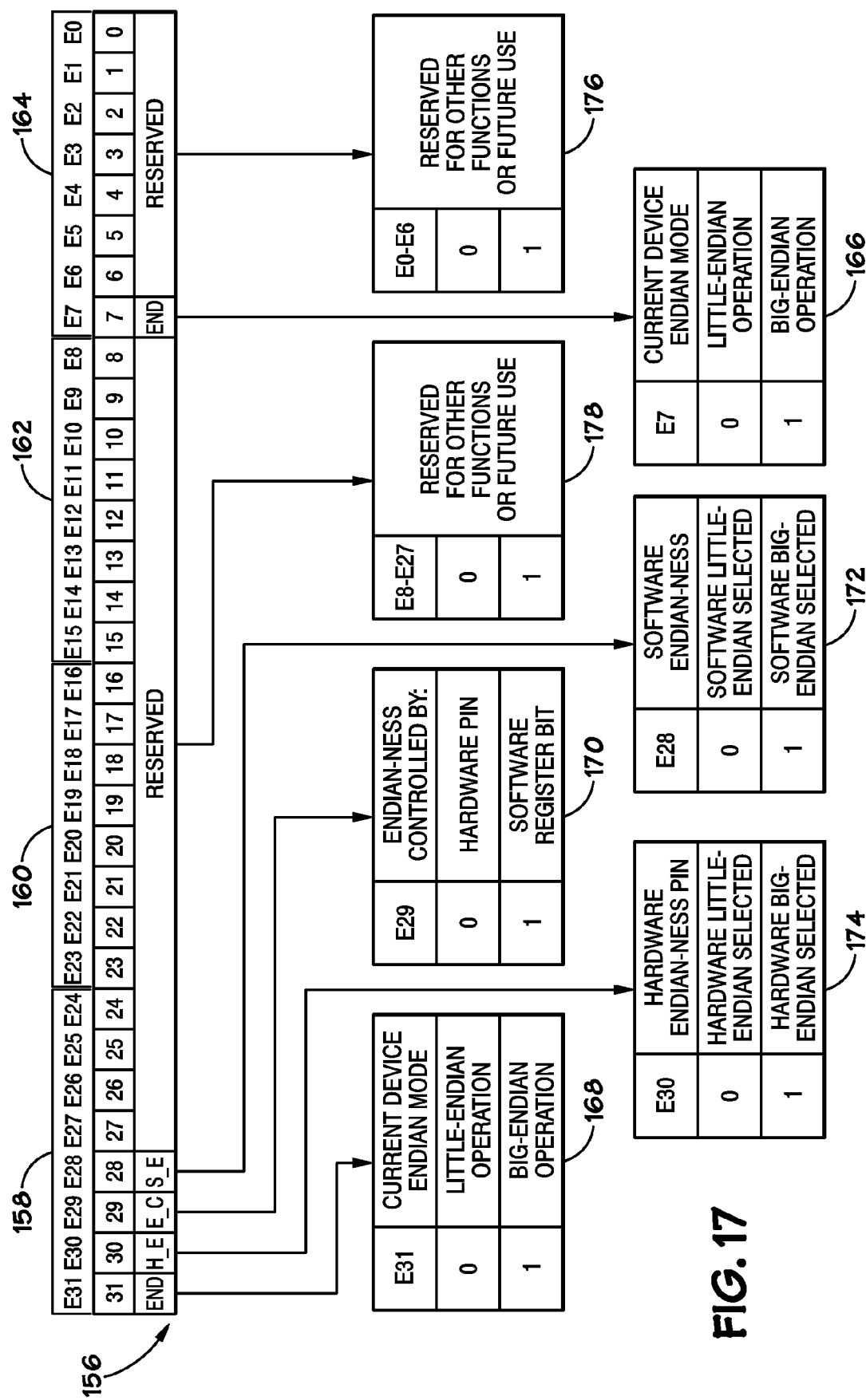
FIG. 17 depicts certain features of a status register of the device of FIG. 14 in accordance with one embodiment.

The one or more registers accessed in step 150 may include a status register 156 that is generally depicted in FIG. 17 in accordance with one embodiment. The status register 156 is illustrated as a 32-bit register, although it will be appreciated that other register-widths may be employed in full accordance with the present technique. The status register 156 includes thirty-two bit positions (bit position 0 to bit position 31), each associated with a memory cell capable of storing a respective data bit E0-E31. In one embodiment, the data bits E0-E31 may be grouped into bytes 158, 160, 162, and 164 in the manner illustrated, and may be read or written in any suitable increments, such as in one-byte increments.

Each bit position and/or group of bit positions of the status register 156 may be associated with a particular characteristic or function. For instance, bit position 7 may be associated with the current endian mode of the device 122, wherein the value of the data bit E7 is set to indicate the current device endian mode, as generally illustrated in table 166. In this embodiment, data bit E7 may be set to "0" to indicate that the device is operating in a little-endian mode, or may be set to "1" to indicate that the device is operating in a big-endian mode. As discussed above, if the system 100 and the device 122 are operating in the same endian mode, the data of bytes 158, 160, 162, and 164 may be transmitted to the system 100, which will recognize the data bit E7 as being stored in bit position 7 of the status register 156. If, however, the system 100 and the device 122 are operating in different endian modes, the system 100, upon receipt of the data, would interpret these bytes in reverse order and associate data bit E7 with bit position 31. Thus, an attempt by the system 100 to read the data bit in bit position 7 of the status register 156 from the device 122 may accurately return data bit E7 if the system 100 and the device 122 agree on a common endian mode, but not if the system 100 and the device 122 operate under different endian modes.

Consequently, in one embodiment, the status register 156 includes a duplicate current device endian mode bit at bit position 31, as generally illustrated in table 168. In this manner, even if the order of bytes 158, 160, 162, and 164 are interpreted differently (e.g., in reverse order of significance) by the system 100, any attempt by the system 100 to read bit position 7 will return either data bit E7 or data bit E31, each of which identically indicates the current endian mode of the device 122. Thus, the system 100 may detect the endian mode of the device 122 based on its attempt to read the value of a data bit in bit position 7, regardless of differences in byte-order endian-ness. Similarly, in other embodiments, the current endian mode of the device may be provided in still further bit positions to account for other types of endian-ness, such as bit-order endian-ness.

As noted above, operation of the device 122 and the system 100 in different endian modes may result in communication errors. Moreover, if a system 100 operating in a first endian mode were to attempt to configure a device 122 operating in a different endian mode (by, for example, writing values to the registers 128), the device 122 may misinterpret the configuration data from the system 100, causing the device 122 to be configured in a manner contrary to that intended. Consequently, in one embodiment, the device 122 is configured to power-on or reset to a default mode that allows reading of the status register 156 (such as by the system 100) without having to perform any configuration writes to the device. Among other things, this facilitates early determination of the endianness of the device 122 by the system 100 and generally facilitates configuration of the device 122, while reducing the likelihood of configuration errors due to mismatched endianness.

It will be appreciated that the status register 156 may also provide indications of other functions or characteristics. In some embodiments, the endian-ness of the device 122 may be controlled by either a hardware input (referred to herein as a hardware endian mode) or by a software input (referred to herein as a software endian mode), and other bit positions of the status register 156 may indicate details of the current manner of control. For example, bit position 29 of the status register 156 may be read to determine whether the endianness of the device 122 is being controlled by hardware (e.g., by the input pin 136) or by a software register bit, as generally illustrated in table 170. In one embodiment, the controlling software register bit is included in a different register, such as the control register 186 discussed below with respect to FIG. 18, although such a control register bit could be included in the status register 156 in other embodiments.

The bit positions 28 and 30 of the status register 156 may be read to determine software and hardware endian modes, respectively. In such an embodiment, the device endian mode of data bits E7 and E31 would match E30 if data bit E29 is set to "0" (indicating hardware control of device endian-ness), and would match data bit E28 if data bit E29 is set to "1" (indicating software control of device endian-ness). The other data bits of the status register 156 may be used for other functions or characteristics, or may remain unused (or reserved for future use), as generally illustrated in tables 176 and 178.

As noted above, the device 122 may be configurable to operate in either of a big-endian mode or a little-endian mode. In some embodiments, the register interface 130 provides hardware translation of data inputs to and outputs from the device 122 based on a selected device endian mode. The device endian mode may be selected by a hardware input (e.g., via the endian-ness input pin 136) to the device 122, by a software input to the device 122, or both. For example, the device 122 may include one or more register bits in the registers 128 for selecting an endian mode for the device 122, and for indicating whether the device endian mode is to be controlled by the hardware input or the software input.

Figure 18:
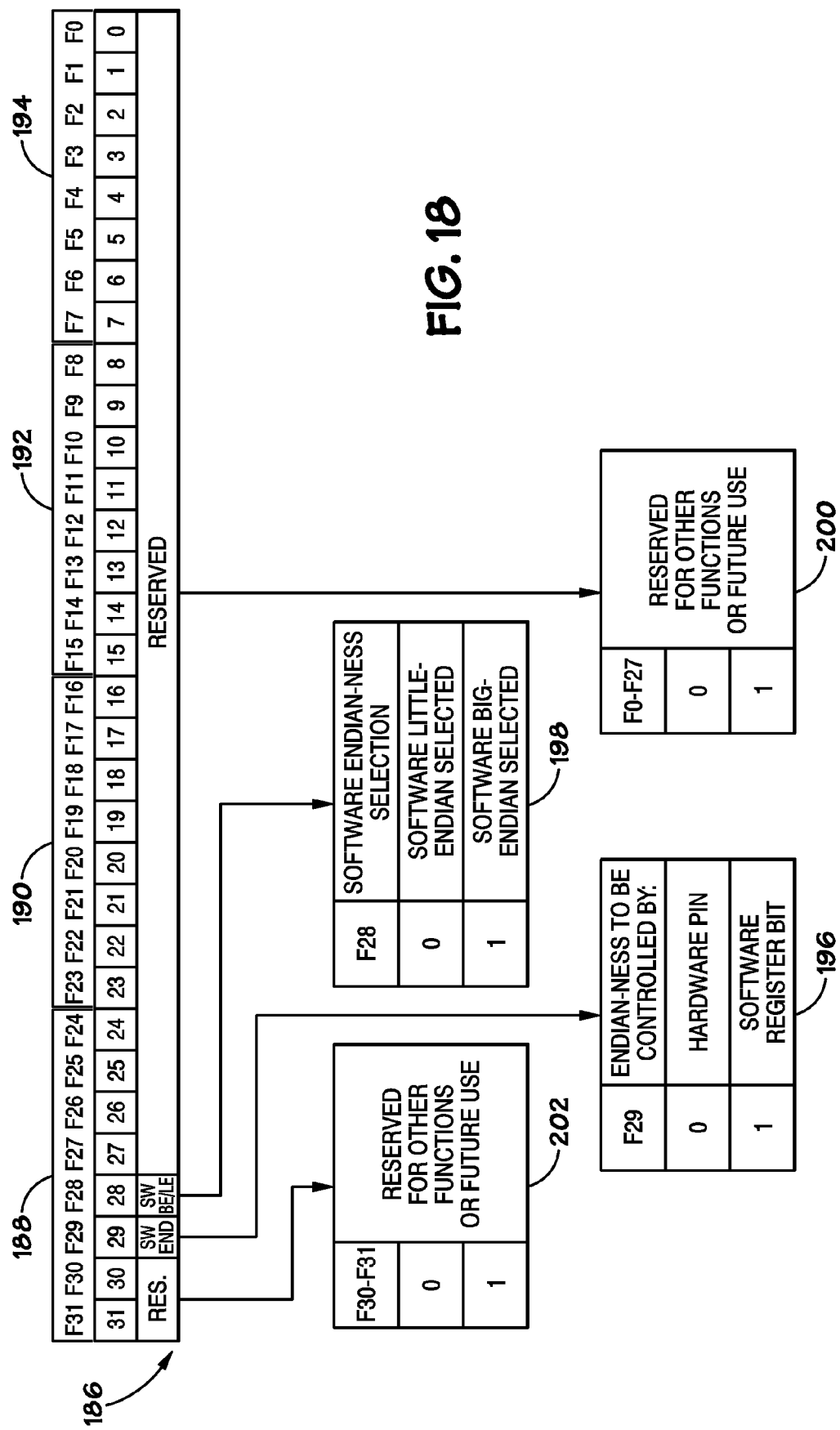
FIG. 18 depicts certain features of a control register of the device of FIG. 14 in accordance with one embodiment.

By way of further example, the registers 128 may include a control register 186 having such register bits, as generally illustrated in FIG. 18 in accordance with one embodiment. The control register 186 is also illustrated as a 32-bit register for explanatory purposes, but other register-widths could be used in other embodiments. In addition, it is noted that while certain examples of the status register 156 and control register 186 are provided herein for explanatory purposes, the various characteristics and functions associated with the bit positions of these registers could be changed within each register, switched between different registers, or combined into a single register. The illustrated control register 186 includes thirty-two bit positions (bit position 0 to bit position 31) capable of storing respective data bits F0-F31. In the present embodiment, the data bits of the control register 186 are grouped into bytes 188, 190, 192, and 194. These data bytes may be written to or read from the control register 186 in one-byte increments, or in any other suitable increments (e.g., increments of one or more bits, one or more nibbles, or increments of multiple bytes).

As generally indicated in table 196, the data bit F29 may be set (such as by the system 100) in one embodiment to "0" to cause the endian mode of the device to be controlled by a hardware input (e.g., based on a signal level on the endian-ness input pin 136), or to "1" to cause the endian mode of the device to be controlled by software (e.g., by setting another register bit to select the endian mode of the device 122). For instance, the data bit F28 may be set to "0" to select little-endian operation of the device 122 and may be set to "1" to select big-endian operation of the device 122, as generally indicated in table 198. In such an embodiment, the device 122 may operate in accordance with a default endian mode controlled by the signal on the endian-ness input pin 136 if the data bit F29 were set to "0", but this default mode could be overridden by setting the data bit F29 to "1". The other data bits of the control register 186 may be used to control other functions, or may remain unused and reserved for future use, as generally represented in tables 200 and 202. Additionally, the data bit F28, or any of the other data bits of the registers 128, may be set automatically by a software driver, firmware, or other software of the system 100 or device 122, or may be set manually by a user via such software.

As the register interface 130 of some embodiments may be configured to control the endian mode of the device 122, it will be appreciated that such embodiments enable efficient communication between the device 122 and the system 100 without requiring the system 100 or some other device to perform software or hardware translation of the communicated data. Further, such embodiments may generally provide a flexible manner of controlling the endian-ness of the device 122, allowing it to effectively operate in conjunction with either of a big-endian system or a little-endian system.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device comprising:
a register comprising a plurality of memory cells, the register configured to receive and store a plurality of data bits, wherein a current endian mode of the device is represented by a device endian mode indicator and a duplicate device endian mode indicator stored in at least two different locations of the register, wherein the device endian mode indicator and the duplicate device endian mode indicator are configured to indicate the current endian mode of the device regardless of an endian mode used to read the register; and
input/output circuitry configured to facilitate communication of the plurality of data bits from the device;
wherein the device is configured to power-on or reset to a default mode that enables reading of the register.

2. The device of claim 1, wherein the device endian mode indicator and the duplicate device endian mode indicator are configured to enable a component receiving the plurality of data bits from the device to recognize the current endian mode of the device.

3. The device of claim 2, wherein the device endian mode indicator and the duplicate device endian mode indicator represent the current endian mode of the device as a little-endian mode using a first bit value and represent the current endian mode of the device as a big-endian mode using a second bit value.

4. The device of claim 1, wherein the device is configured to selectively operate in one of two different endian modes.

5. The device of claim 4, wherein the device is configured to operate in a selected one of the two different endian modes in response to a signal received on a hardware input of the device.

6. The device of claim 5, wherein the device is configured to enable a software override of the signal received on the hardware input.

7. The device of claim 6, comprising a memory medium including executable routines configured to override the signal received on the hardware input.

8. The device of claim 6, wherein the device is configured such that the software override is enabled in accordance with a software override data bit stored in a particular bit position of the register and/or in a particular bit position of an additional register.

9. The device of claim 8, wherein the device is configured such that the current endian mode of the device is controlled in accordance with a software endian select bit if the software override is enabled.

10. The device of claim 9, wherein the software endian select bit is stored in a bit position of the additional register.

11. The device of claim 1, wherein the input/output circuitry is configured to connect to a data bus.

12. The device of claim 11, wherein the data bus includes at least one of a synchronous dynamic random access memory bus, a double data rate memory bus, or some other multi-byte parallel bus.

13. The device of claim 1, wherein the device includes a pattern recognition device.

14. A device comprising:
a plurality of registers configured to store an indication of a current endian mode of the device as represented by a device endian mode indicator and a duplicate device endian mode indicator stored in at least two different locations of a register of the plurality of registers, wherein the device endian mode indicator and the duplicate device endian mode indicator are configured to indicate the current endian mode of the device regardless of an endian mode used to read the register;
a register interface configured to read data from, and write data to, the plurality of registers, wherein the register interface is a hardware interface configured to selectively operate in one of a little-endian mode or a big-endian mode and to translate data read from and/or written to the plurality of registers based on a selected device endian mode; and an endian mode hardware pin, wherein the register interface is configured to operate in a default endian mode based on a signal received on the endian mode hardware pin.

15. The device of claim 14, wherein the device is configured to enable the default endian mode to be overridden for operation of the register interface in an endian mode different than the default endian mode.

16. The device of claim 15, wherein a register of the plurality of registers includes a register bit for controlling override of the default endian mode.

17. A system comprising:
a processor;
a storage device including application instructions stored therein for execution by the processor; and
an additional device communicatively coupled to the processor by a data bus, wherein the additional device comprises a register, wherein a current endian mode of the device is represented by a device endian mode indicator and a duplicate device endian mode indicator stored in at least two different locations of the register, wherein the device endian mode indicator and the duplicate device endian mode indicator are configured to indicate the current endian mode of the device regardless of whether a particular endian mode or a different endian mode is used to read the register;
wherein the processor and the data bus are configured to operate in accordance with the particular endian mode and read the current endian mode of the additional device from one of the device endian mode indicator and the duplicate device endian mode in accordance with the particular endian mode.

18. The system of claim 17, comprising a computer including the processor.

19. The system of claim 18, wherein the additional device includes at least one of a router or a modem communicatively coupled to the computer.

20. The system of claim 18, wherein the computer includes the storage device.

21. The system of claim 18, wherein the computer includes the additional device.

22. The system of claim 17, wherein the application instructions stored within the storage device include instructions for detecting the current endian mode of the additional device.

23. A method comprising:
accessing data stored in a register of a device, wherein a current endian mode of the device is represented by a device endian mode indicator and a duplicate device endian mode indicator stored in at least two different locations of the register, wherein the device endian mode indicator and the duplicate device endian mode indicator are configured to indicate the current endian mode of the device regardless of an endian mode used to read the register; and
determining the current endian mode of the device by reading, via a processor, the device endian mode indicator if the accessed data is read in accordance with a first endian mode, or by reading the duplicate device endian mode indicator if the accessed data is read in accordance with a second endian mode.

24. The method of claim 23, comprising changing the endian mode of the device.

25. The method of claim 24, wherein changing the endian mode of the device includes overriding, via software, a default endian mode.

26. The method of claim 25, wherein overriding a default endian mode includes overriding a default endian mode selected by a signal on a hardware input of the device.

27. The method of claim 24, wherein changing the endian mode of the device includes changing a value of the device endian mode indicator and the duplicate device endian mode indicator.

28. The method of claim 27, comprising automatically setting the value via a software driver, firmware, or other software.

29. The method of claim 27, comprising manually setting the value via a software driver, firmware, or other software.

* * * * *